Nov. 3, 1942.   T. R. LAING   2,301,054
FILM FEED
Filed Dec. 4, 1940   2 Sheets-Sheet 1
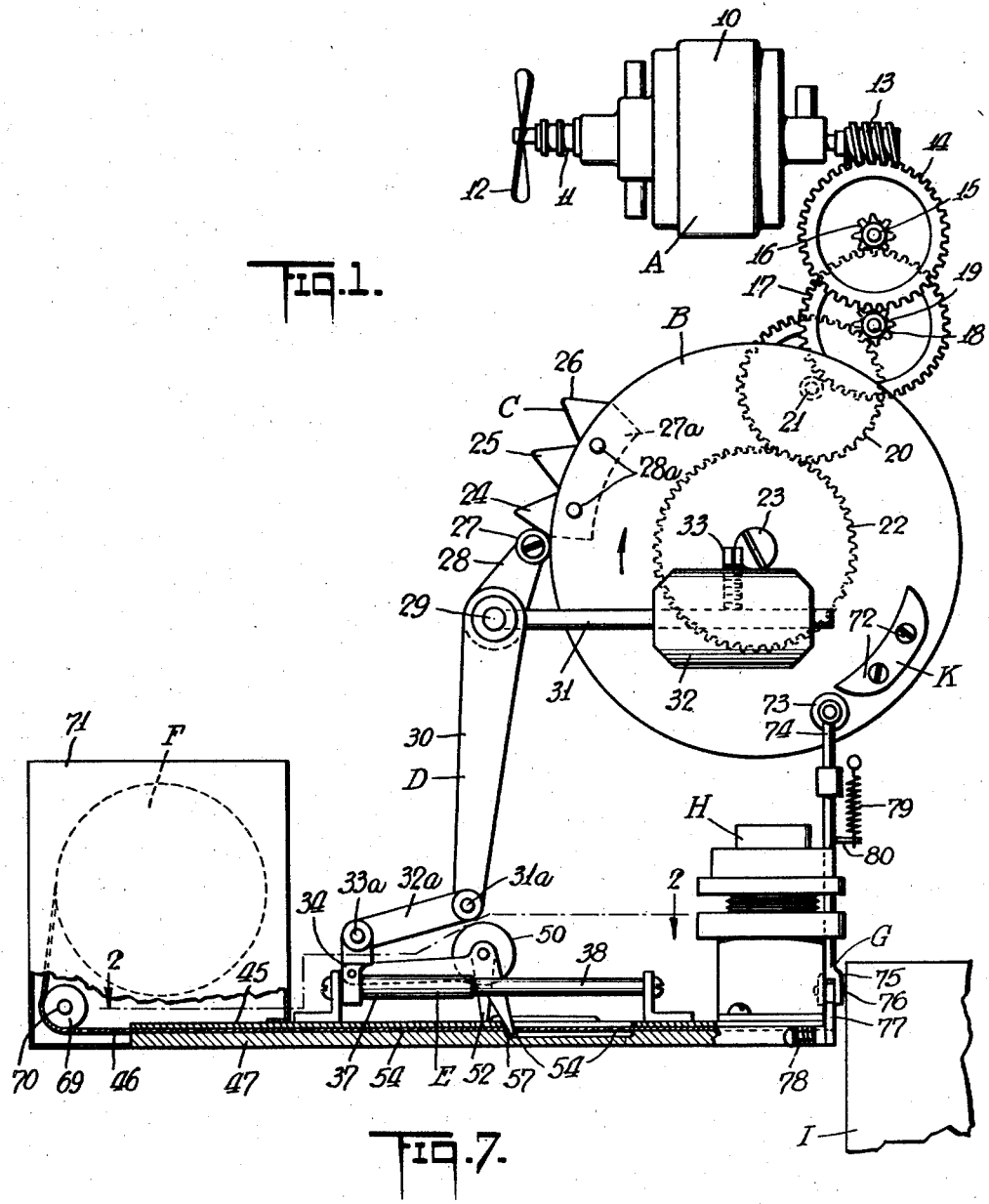
Fig.1.
Fig.7.
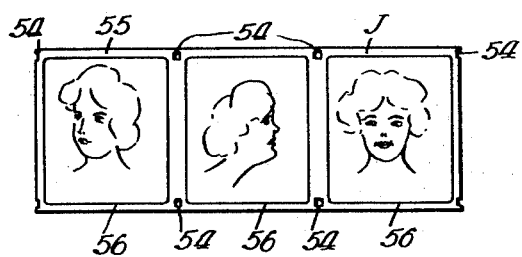
INVENTOR
Torrance R. Laing
BY
ATTORNEY Nov. 3, 1942.　　　　　T. R. LAING　　　　　2,301,054
FILM FEED
Filed Dec. 4, 1940　　　　　2 Sheets-Sheet 2
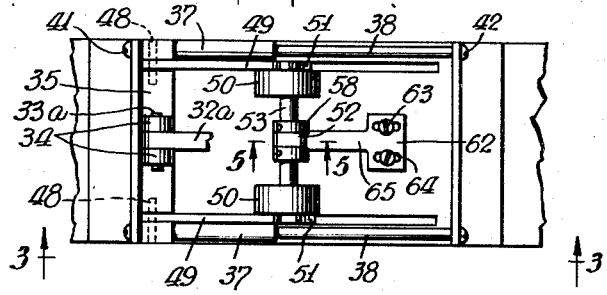
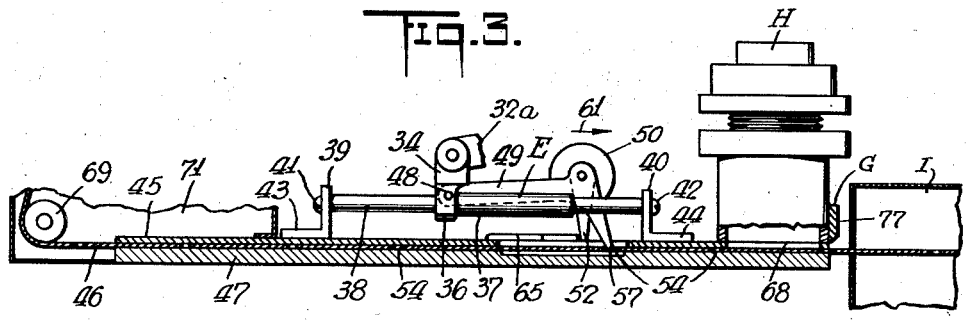
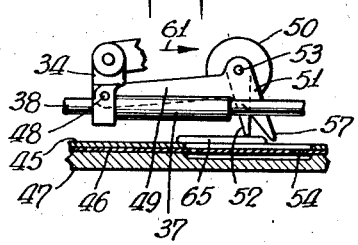
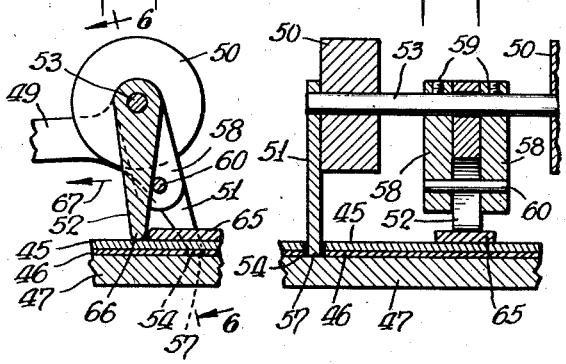
INVENTOR
Torrance R. Laing
BY
ATTORNEY Patented Nov. 3, 1942

2,301,054

UNITED STATES PATENT OFFICE 2,301,054

FILM FEED

Torrance R. Laing, New York, N. Y.

Application December 4, 1940, Serial No. 368,483

3 Claims. (Cl. 164—88)

The present invention relates to a film feed and it particularly relates to a photographic film feed device.

Although not restricted thereto, the present invention will be particularly described in its application to coin controlled photographic machines which are designed automatically to take a picture and deliver such picture upon insertion of a coin.

It is among the objects of the present invention to provide a simple, inexpensive and readily operated mechanism for enabling the taking of a plurality of pictures or making of multiple exposures in a strip or in succession without manual intervention upon the insertion of a single coin or several coins.

Another object of the present invention is to provide a simple inexpensive film feed mechanism which may be readily associated with coin controlled automatic photographic machines and which, without any substantial change in the construction of such machines, may readily feed a plurality of frames in a strip of light sensitive film from a roll first to an exposure position and after a plurality of successive exposures to a cutting position where the strip is detached for development.

Still further objects and advantages will appear from the more detailed description set forth below, it being understood, however, that this more detailed description is given by way of illustration, since various changes therein may be made by those skilled in the art without departing from the scope and spirit of the invention.

In accomplishing the above objects it has been found most satisfactory according to the present invention to provide a motor drive to control a main multi-lobe or multi-toothed cam control, which in turn will actuate a slider member for causing successive advances of a strip of film being fed from a roll past an exposure position with said device after a desired number of exposures have been made, actuating a cam to cut off the strip of film.

In the drawings, which illustrate one of the preferred embodiments of the present invention, but to which the invention is by no means restricted, since many changes and alterations might be made, all within the scope of the invention of the present specification:

Fig. 1 is an elevational view of the device partly in section,

Fig. 2 is a top view partly in section taken upon the line 2—2 of Fig. 1,

Fig. 3 is a side sectional view upon the line 3—3 of Fig. 2,

Fig. 4 is a fragmentary side view of the structure of Fig. 3, upon a slightly different position, Fig. 5 is a transverse sectional view upon an enlarged scale as compared to Figs. 2 and 4, illustrating the position of the various parts, and Fig. 6 is a transverse sectional view upon the line 6—6 of Fig. 5, and Fig. 7 is a plan view of a three film strip after exposure, cutting and development.

Although not specifically limited thereto, the present invention is particularly designed to be utilized in combination with the mechanism shown in patents 1,576,674 and 1,653,408, issued respectively on March 16, 1926, and December 20, 1927, on applications filed respectively July 30, 1925, and July 2, 1925, said applications having both been filed by Robert E. Olsen.

According to the structure shown in these patents, a magazine was provided holding a plurality of single exposure sheets with suitable frame members, which sheets, together with their frames, were moved to an exposure position and then to a development position after exposure.

The invention of the present application is designed to permit such automatic photographic machine, as shown in these two patents, to utilize a roll of light sensitive paper or film, a plurality of frames of which—say three in number—may be moved past an exposure position and then cut off and passed to a development chamber.

Referring particularly to Fig. 1, there is provided a main drive A, a control cam member B having the cam element C for causing movements to present successive frames to exposure position through the lever arrangement D and the slider arrangement E from the roll of film F.

The main control device or cam B is also provided with a member K to control the cutting mechanism G.

The lens arrangement H and the development tank I may be of the same construction as already described in connection with said Olsen Patents 1,576,674 and 1,653,408, but it is to be understood that the successive feed device of the present application may be widely used in other connections and with other automatic photographic machines than those shown in these Olsen patents.

The exposure film strip or picture strip which is obtained as a result of the operation of the mechanism of Fig. 1 is indicated at J.

Referring particularly to Fig. 1, there is shown the motor A having the casing 10 and the shaft 11, with the element 12 which may serve as a governor.

The shaft of the motor is connected to the worm 13, which drives the gear 14 on the shaft 15.

Turning with the gear 14 is the pinion 16, which meshes with the gear 17 on the shaft 18. The gear 17 carries the pinion 19, which meshes with the gear 20 on the shaft 21. The gear 21 meshes with the gear 22 on the shaft 23, which drives the control wheel B.

The worm and gear train 14, 16, 17, 19, 20, 22 reduces the speed of the motor 10, so that the control wheel B will be moved or rotated at a very slow rate.

Fitted upon one side of the control wheel B are the cam or tooth elements C, which may be of varying shape and spacing, depending upon the speed of the wheel B and the length of film F which it is desired to advance for each exposure.

These teeth 24, 25 and 26 actuate the film F in the order indicated, and it will be noted that they are all mounted on one place 27a riveted at 28a to the periphery of the wheel B. These teeth 24, 25 and 26 successively operate on and move the roller 27 on the lever 28, said lever 28 being pivotally mounted on a shaft 29 and being connected to a downwardly extending arm 30 and to an outwardly extending arm 31.

The arm 31 carries the adjustable weight 32, having the set screw 33. By loosening the set screw 33 and varying the position of the weight 32 upon the arm 31, the ease of movement of the arms 29 and 30 upon contact of the teeth 24, 25, and 26 with the roller 27 may be readily controlled.

The arm 30 is pivotally connected at its lower end by the pin 31a to the link 32a, which in turn is pivotally connected at 33a to the ear members 34, which extend upwardly from the cross bar 35 of the slider member E.

The cross bar 35 is connected to the depending holed members 36, which carry the sleeves 37 and which ride upon the bars 38.

These bars 38 are held by the uprights 39 and 40 by the screws 41 and 42. The uprights 39 and 40 are attached by the legs 43 and 44 to the base plate 45 below which feeds the strip 46 from the film roller F.

Below the film is the main support plate 47 by which the entire mechanism may be connected to the automatic photographic coin control machine.

Pivotally connected at 48 to below the cross bar 35 are the loosely swinging arms 49 carrying the weights 50, as shown in Figs. 1, 3, 4 and 5.

These arms 49 carry the downwardly projecting fingers 51 and also the loosely hanging finger 52, which is suspended from the pivot point 53.

The fingers 51 when in lowered position, as for example indicated in Figs. 1 and 3, fit into openings 54 positioned in the margin 55 around the frames 56 of the film strip J (see particularly Fig. 7).

In the position shown in Fig. 4, the lower portion 57 of said fingers 51 will be elevated out of said recesses 54 in said strip of film J.

As shown best in Figs. 5 and 6 on the shaft 53 there are fixed the elements 58 by the set screws 59 positioned on both sides of the loosely hanging finger member 52. Between these side members 58 there extends a pin 60, which will limit movement of the finger 52 in the direction 61, indicated in Figs. 3 and 4.

Attached to the plate 45 is the member 62 held in position by the screw 63 in the slot 64 and having the extension 65. Said plate ordinarily will contact with the lower end 66 of the hanging finger 52, permitting said hanging finger to swing freely in the direction 67 when the slide moves in the direction 61 and the lower ends 57 of the fingers 51 are in engagement with the openings 54 and are advancing the strip of film J.

On the other hand, when the slider after having fed a frame 56 to exposure position, as indicated at 68 in Fig. 3, returns in the direction 67, then the lower end 66 of the depending finger 52 will be elevated by the plate 65 and in being thus elevated will strike the pin 60, elevating the lower ends 57 of the fingers 51 out of the openings 54.

The film 46 upon being advanced each time by the slider member E with its engagement fingers 51, will pass over the roller 69 having the pivot 70 in the box 71.

When the three exposures have been made and the film has been advanced into the development chamber I, the lobe member K held by the screws 72 on the wheel B will contact the roller 73 on the shaft 74.

The lower end of the shaft 74 carries the knife 77 by the clevice 75 and the pin 76, the knife 77 being held against its ledger blade (not shown) by the spring member 78. This knife 77 will be lifted to inactive position by the spring 79 connected at 80 to the shaft 74 and the cam K will press the knife 77 against the action of the spring 79 to cut off the strip of film, which then will pass into the development tank to be developed in due course.

It is thus apparent that the applicant has provided a simple, inexpensive film feed device, which may be widely utilized for coin control photographic equipment and which may be readily assembled with any desired automatic photographic coin control machine without substantial change therein and without reconstruction.

By the expression "frame" is meant the space for a picture upon the film or printing paper, as the case may be, which normally will have a central portion for the exposure and an unexposed white or transparent frame and which the name for the entire portion of the film is derived. The strip of film, shown on Fig. 7 for example, has three frames.

As many changes could be made in the features and details, and many apparently widely different embodiments could be made without departing from the scope thereof, it is intended that all matter contained in the above description shall be interpreted as illustrative and not in a limiting sense.

What is claimed is:

1. A film feed device for film having a plurality of successive frames with perforations, comprising a holder for a roll of film exposure, means to hold the film at an exposure position, a guideway for the film from said exposure position to said roll, reciprocatory means to feed said film a frame or more at a time from said roll to said exposure position and rotary means to drive said reciprocatory means to cause a predetermined number of frames to be fed at a time, first to and then beyond said exposure position, said reciprocatory means including fingers to engage said perforations, a carriage carrying said fingers, slider rods for said carriage and mounts for said slider rods on said guideway and said rotary means including a motor driven toothed cam and a weighted lever arrangement operated by said cam to operate said carriage.

2. A film feed device for a film having a plurality of frames with side perforations to be successively exposed, means to advance said film successively a plurality of frames across an exposure position comprising a reciprocatory feed member comprising a finger to engage one of said perforations and advance the film a frame, a pivot mount for said finger, another finger turning with said first finger to ride over the film upon return to said first finger and cause said first finger to disengage itself from the perforation, a weighted lever carrying said fingers, a pair of guide rods at the sides of said exposure position, a reciprocatory carrier on said guide rods, a pin connected to said carrier in turn carrying said weighted lever and means to reciprocate said carrier, said carrier being actuated by and under the control of the weighted lever.

3. The device of claim 2, said last mentioned means including the lever arrangement and a multi-lobed cam.

TORRANCE R. LAING.